United States Patent
Immonen (10) Patent No.: US 7,382,882 B1
(45) Date of Patent: Jun. 3, 2008

(54) SECURE SESSION SET UP BASED ON THE WIRELESS APPLICATION PROTOCOL

(75) Inventor: Olli Immonen, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/720,971

(22) PCT Filed: Jul. 2, 1999

(86) PCT No.: PCT/EP99/04720

§ 371 (c)(1),
(2), (4) Date: Apr. 6, 2001

(87) PCT Pub. No.: WO00/02358

PCT Pub. Date: Jan. 13, 2000

(30) Foreign Application Priority Data

Jul. 3, 1998  (DK) .............................. 1998 00867

(51) Int. Cl.
*H04K 1/00* (2006.01)
*H04L 9/00* (2006.01)
*H04L 9/32* (2006.01)

(52) U.S. Cl. ...................... 380/270; 380/247; 713/171; 726/5; 726/9

(58) Field of Classification Search ................ 380/247, 380/270–271; 713/200–202, 168–171, 155; 726/5, 9
See application file for complete search history.

(56) References Cited

U.S. PATENT DOCUMENTS

| 5,307,411 | A | | 4/1994 | Anvret et al. |
| 5,371,794 | A | | 12/1994 | Diffie et al. |
| 5,485,519 | A | * | 1/1996 | Weiss .......................... 713/185 |
| 5,557,679 | A | | 9/1996 | Julin et al. |
| 6,240,512 | B1 | * | 5/2001 | Fang et al. ................. 713/150 |
| 6,931,528 | B1 | * | 8/2005 | Immonen .................... 713/151 |
| 2005/0232428 | A1 | * | 10/2005 | Little et al. ................. 380/277 |

FOREIGN PATENT DOCUMENTS

| DE | 19542732 | | 5/1997 |
| EP | 0538216 | | 4/1993 |
| EP | 538216 A1 | * | 4/1993 |

(Continued)

OTHER PUBLICATIONS

"Banking by Mobile Phone" King by Mobile Phone, Siemens, Telcom Report, pp. 1-3.

(Continued)

*Primary Examiner*—Matthew Smithers
*Assistant Examiner*—Zachary A. Davis
(74) *Attorney, Agent, or Firm*—Foley & Lardner LLP (57) ABSTRACT

Method, apparatus, memory card, and system for establishing a secure connection between a wireless communication apparatus and a data communication apparatus based on a wireless application protocol. The wireless communication apparatus is provided with contact means for receiving information from a separate unit provided with memory means. The memory means comprising information to control the access of the wireless communication apparatus through a wireless communication network connected to said data communication apparatus.

65 Claims, 2 Drawing Sheets

FOREIGN PATENT DOCUMENTS

| | | | |
|---|---|---|---|
| GB | 2 342 817 A | | 4/2000 |
| WO | 9723972 | | 7/1997 |
| WO | 9724831 | | 7/1997 |
| WO | WO 97/24831 | * | 7/1997 |
| WO | 9837661 | | 8/1998 |
| WO | 9925093 | | 5/1999 |
| WO | WO 99/39524 | | 8/1999 |

OTHER PUBLICATIONS

"Wireless Application Protocol Identity Module Specification" WAP WIM WAP-198-WIM Version Feb. 18, 2000, Part: Security, pp. 1-100.

R. Gellens: "Wireless Device Configuration" Network working group Online, Jun. 1999 (XP 002270237).

European Search Report dated Jan. 3, 2004.

* cited by examiner

SECURE SESSION SET UP BASED ON THE WIRELESS APPLICATION PROTOCOL

TECHNICAL FIELD OF THE INVENTION

The Wireless Application Protocol defines an industry-wide specification for developing applications that operate over wireless communication networks. The wireless market is growing very quickly, and reaching new customers and services. To enable operators and manufacturers to meet the challenges in advanced services, differentiation and fast/flexible service creation a set of protocols has been designed in transport, security, transaction, session and application layers.

BACKGROUND OF THE INVENTION

WAP security functionality includes the Wireless Transport Layer Security (WAPWTLS) and application level security, accessible using Wireless Markup Language Script (WMLScript). For optimum security, some parts of the security functionality need to be performed by a tamper-resistant device, so that an attacker cannot retrieve sensitive data. Such data is especially the permanent private keys used in WTLS handshake with client authentication, and for making application level electronic signatures (such as confirming an application level transaction). In WTLS, also master keys (master secrets) are relatively long living—which could be several days—this is in order to avoid frequent full handshakes where are quite heavy both computationally and due to relatively large data transfer. Master secrets are used as a source of entropy, to calculate MAC keys and message encryption keys which are used to secure a limited number of messages, depending on usage of WTLS.

U.S. Pat. No. 5,307,411 describes the set up of a secure communication session between two communication units, such as phones or facsimile machines. The secure session is controlled by separate smart cards based verification units associated with a respective one of the communication units. These two verification units exchange random numbers, encrypt these numbers by using private keys, and return the encrypted numbers to their origin. Then the encrypted random numbers are decrypted based on public keys. If the received numbers correspond to the transmitted numbers, the parties verify each other and the secure session may take place. However, this requires that both communication units are provided with a smart card reader, which is not a necessary requirement in a server, like e.g. an Internet server. Thus, this document is quite restricting for the user, since it requires that both parties have a smart card reader, and is less suitable for communication between a wireless communication apparatus and a data communication apparatus. Also, every time a session is going to be established between the two communication apparatuses, an exchange of keys must be done.

Also, U.S. Pat. No. 5,371,794, by Sun Microsystems, discloses a way to providing a secure wireless communication link between a mobile nomadic device and a base computing unit. The mobile device sends a host certificate to the base along with a randomly chosen challenge value (CH1) and a list of supported shared key algorithms. The base sends a random number (RN1) encrypted in the mobile's public key and an identifier for the chosen algorithm back to the mobile. The base saves the RN1 value and adds the CH1 value and the chosen algorithm to the mobile. The mobile verifies the public key of the base the signature on the message. When the public key is verified, the mobile determines the value of the RN1 by decrypting the public key under the private key of the mobile. The mobile then generates RN2 and a session key, and encrypts RN2 under the public key of the base to the base. The base verifies and decrypts the RN2, and determines the session key. Finally, the mobile and the base can enter a data transfer phase using encrypted data which is decrypted using the session key which is RN1+RN2. The values of RN1 and RN2 are always derived from the last key exchange, which may be from the initial connection setup or from the last key change message, whichever is more recent. This means that each time a data transfer is made, two new numbers are generated based on RN1 and RN2, which will make the data transfer quite slow. Thus, as in U.S. Pat. No. 5,307,411, every time a session is going to be established between the two apparatuses, in this case the mobile nomadic device and the base computing unit, an exchange of keys must be done.

SUMMARY OF THE INVENTION

The present invention establishes a secure connection between a wireless communication apparatus and a data communication apparatus based on a wireless application protocol.

The user is enabled to re-establish a secure connection at a later occasion, since establishing a secure connection is a heavy procedure both computationally and due to intensive data transfer. That is why, there is a need to use a mutually agreed master secret for a relatively long time. The problem is to store the master key in a secure way. Partly due to that problem, it is common practice to restrict the lifecycle of the master secret and the associated secure session to for example, 24 hours, after which it is required to perform the heavy key establishment procedure anew.

The present invention connects a wireless communication apparatus, for example a cellular phone, to a separate unit, for example a smart card, a SIM (Subscriber Identity Module) card, etc., which may store sensitive data of a secure connection. This means that the wireless communication apparatus has some kind of contact means, for example wireless (for example infra-red, radio frequency, etc.) or physical (i.e. and electrical contact), for receiving information from the separate unit, that is, the unit is provided with memory means. The memory means comprises information to control an access of the wireless communication apparatus through a wireless communication network, for example a cellular phone network, connected to a data communication apparatus, for example, a server, which supports a Wireless Application Protocol (WAP).

One advantage of using a separate unit, when establishing a secure connection, is that it will be much easier to re-establish a connection to the data communication apparatus. Thus, it is possible to save information, for example signatures, secret keys, etc., in the memory means, and the information may be re-used in another secure connection. In order to avoid fraud, the re-use of a secure connection can be restricted for limited period of time. By saving this information in the memory means the second object will be achieved.

Another advantage is that the user pays less when re-establishing a secure session, in a case when necessary information for re-establishing is saved.

To establish a connection, the wireless communication apparatus connects to the separate unit, accessing the wireless communication network connected to said data communication apparatus. Then the wireless communication apparatus transmits a request to the data communication apparatus. This request comprises information of which pre-defined algorithm(s) the wireless communication apparatus supports. When the data communication apparatus receives this request, it chooses at least one algorithm, associated with a public key and a private key, and transmits a message back to the wireless communication apparatus. This message comprises the public key and information about which algorithm the data communication apparatus has chosen. When the wireless communication apparatus receives the message, comprising the public key, it will generate a master secret code, and calculates a signature based on the chosen algorithm, the public key and the master secret code. Thereafter, the wireless communication apparatus will transmit a response to the data communication apparatus. This response comprises the calculated signature. When the data communication apparatus receives the response, comprising the signature, it will calculate the master secret code based on the chosen algorithm, the signature received, and the private key. Finally the data communication apparatus will be able to establish a secure connection to the wireless communication apparatus.

In accordance with the first aspect of the present invention there is provided a method for establishing a secure connection between a wireless communication apparatus and a data communication apparatus based on a wireless application protocol, wherein said wireless communication apparatus has memory means including a separate unit comprising information to control the access of the wireless communication apparatus through a wireless communication network connected to said data communication apparatus, comprising the following steps: connecting said wireless communication apparatus to the separate unit, accessing the wireless communication network connected to said data communication apparatus, the wireless communication apparatus transmits a request to the data communication apparatus to establish a connection, said request comprising information of which pre-defined algorithm(s) the wireless communication apparatus supports, upon reception of said request, the data communication apparatus chooses at least one algorithm associated with a public and a private key, and transmits a message back to the wireless communication apparatus, said message comprising the public key and information about which algorithm the data communication apparatus has chosen, upon reception of the message comprising, the public key, the wireless communication apparatus generates a master secret code, and calculates a signature based on the chosen algorithm, the public key and the master secret code, and transmits a response to the data communication apparatus, said response comprising the calculated signature, upon reception of the response comprising the signature, the data communication apparatus calculates the master secret code based on the chosen algorithm, the signature received and the private key, and establishes a secure connection to the wireless communication apparatus, and saving said master secret code on said memory means and in the data communication apparatus, in order to re-establish the connection at a later occasion.

According to a second aspect of the present invention there is provided wireless communication apparatus for establishing a secure connection to a data communication apparatus based on a wireless application protocol, said wireless communication apparatus comprising: communication means for establishing a connection to a wireless communication network connected to said data communication apparatus, memory means including a separate unit provided with information to control the access of the data communication apparatus through the wireless communication network, means for generating a master secret code control means arranged to use a pre-defined algorithm(s) for generating a signature based on said master secret code and a public key received from said data communication apparatus, for use when the wireless communication apparatus establishes a secure connection to the data communication apparatus, said memory means comprising a secure database for storing at least one master secret code and/or at least one signature related to one or more data communication apparatus, in order to re-establish a secure connection to a data communication apparatus.

According to a third aspect of the present invention there is provided memory card for establishing a secure connection between a wireless communication apparatus and a data communication apparatus based on a wireless application protocol, arranged to be connected to contact means, provided on said wireless communication apparatus, for providing information from the memory card to the wireless communication apparatus upon establishing a secure session to a data communication apparatus, said information is arranged to control the access of the data communication apparatus through a wireless communication network, and to save a calculated master secret related to one or more data communication apparatus, in order to re-establish a secure connection to a data communication apparatus.

Further advantages of the vane arrangement according to the present invention will be apparent from the dependent claims.

DETAILED DESCRIPTION OF EMBODIMENTS

Figure 1:
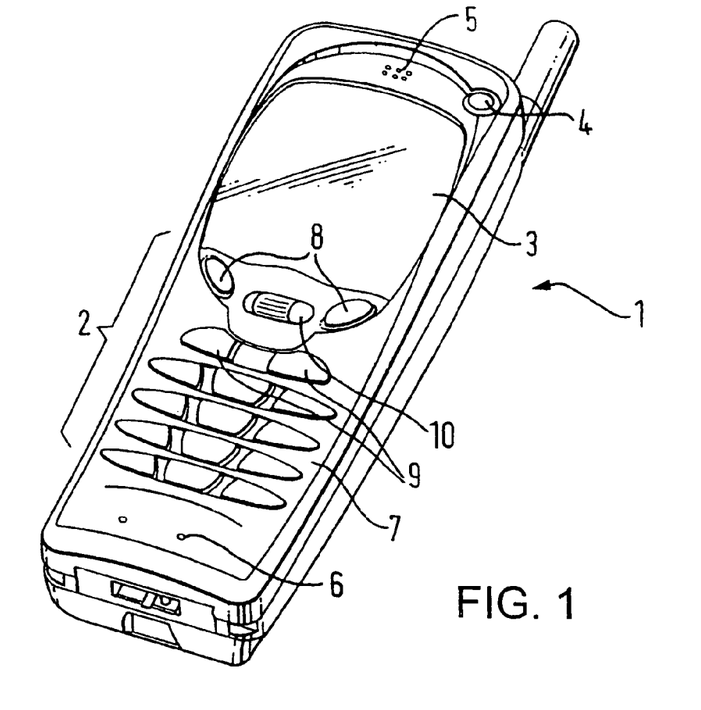
FIG. 1 schematically illustrates a preferred embodiment of a hand portable phone according to the invention.

FIG. 1 shows a preferred embodiment of a phone according to the invention, and it will be seen that the phone, which is generally designated by 1, comprises a user interface having a keypad 2, a display 3, an on/off button 4, a speaker 5, and a microphone 6. The phone 1 according to the preferred embodiment is adapted for communication via a cellular network, but could have been designed for a cordless network as well. The keypad 2 has a first group 7 of keys as alphanumeric keys, by means of which the user can enter a telephone number, write a text message (SMS), write a name (associated with the phone number), etc. Each of the twelve alphanumeric keys 7 is provided with a figure "0-9" or a sign "#" or "*", respectively. In alpha mode each key is associated with a number of letters and special signs used in text editing.

The keypad 2 additionally comprises two soft keys 8, two call handling keys 9, and a navigation key 10.

The two soft keys 8 have a functionality corresponding to what is known from the phones Nokia 2110™, Nokia 810™ and Nokia 3810™. The functionality of the soft keys depends on the state of the phone and the navigation in the menu by using a navigation key. The present functionality of the soft keys 8 is shown in separate fields in the display 3 just above the keys 8.

The two call handling keys 9 according to the preferred embodiments are used for establishing a call or a conference call, terminating a call or rejecting an incoming call.

The navigation key 10 is an up/down key and is placed centrally on the front surface of the phone between the display 3 and the group of alphanumeric keys 7. Hereby the user will be able to control this key with his thumb. This is the best site to place an input key requiring precise motor movements. Many experienced phone users are used to one-hand handling. They place the phone in the hand between the finger tips and the palm of the hand. Hereby the thumb is free for inputting information.

Figure 2:
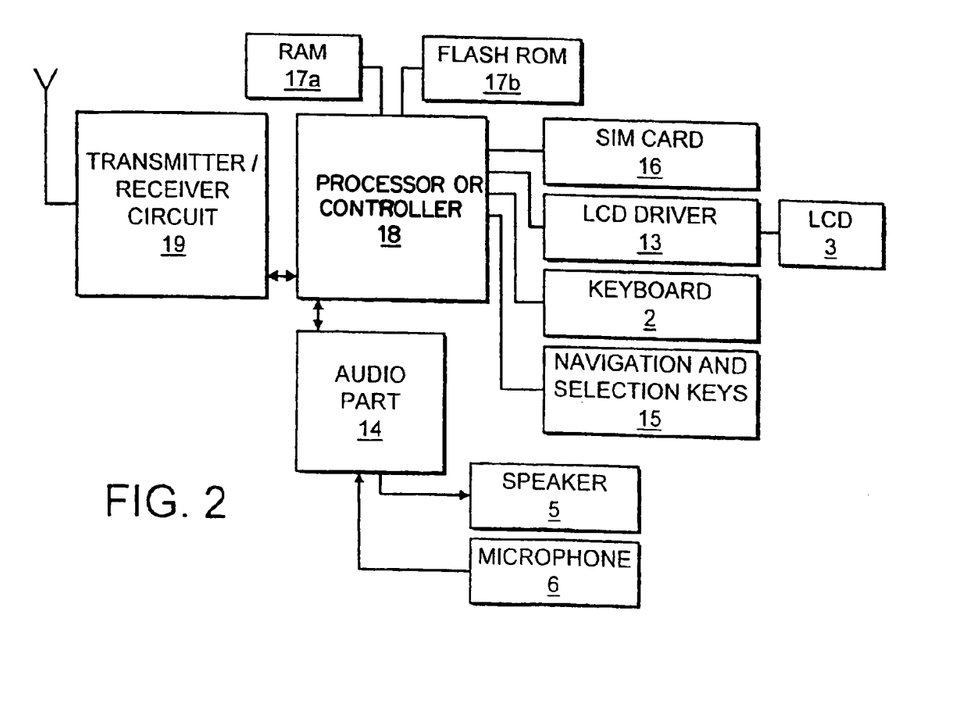
FIG. 2 schematically shows the essential parts of a telephone for communication with a cellular or cordless network.

FIG. 2 schematically shows the most important parts of a preferred embodiment of the phone, said parts being essential to the understanding of the invention. The preferred embodiment of the phone of the invention is adapted for use in connection with the GSM network, but, of course, the invention may also be applied in connection with other phone networks, such as cellular networks and various forms of cordless phone systems or in dual band phones accessing sets of these systems/networks. The microphone 6 records the user's speech, and the analog signals formed thereby are A/D converted in an A/D converter (not shown) before the speech is encoded in an audio part 14. The encoded speech signal is transferred to the controller 18, which supports the GSM terminal software. The processor or controller 18 also forms the interface to the peripheral units of the apparatus, including a RAM memory 17a and a Flash ROM memory 17b, a SIM card 16, the display 3 and the keypad 2 (as well as data, power supply, etc.). The processor or controller 18 communicates with the transmitter/receiver circuit 19. The audio part 14 speech-decodes the signal, which is transferred from the processor or controller 18 to the earpiece 5 via an D/A converter (not shown).

The processor or controller 18 is connected to the user interface. Thus, it is the processor or controller 18 which monitors the activity in the phone and controls via the LCD drive 13 the display 3 in response thereto.

Therefore, it is the processor or controller 18 which detects the occurrence of a state change event and changes the state of the phone and thus the display text. A state change event may be caused by the user when activating the keypad including the navigation key 10, and these types of events are called entry events or user events. However, the network communicating with the phone may also cause a state change event. This type of event and other events beyond the user's control are called non user events. Non user events comprise status change during call set-up, change in battery voltage, change in antenna conditions, message on reception of SMS, etc.

An example of a tamper-resistant device is a smart card (SC). In the phone, it can be the Subscriber Identity Module (SIM) or an external smart card.

The way in which a phone and a smart card interact is specified as a command-response protocol. The goal of this protocol is to provide means for a WAP handset to utilize smart cards in performing WTLS and application level security functions. The functionality presented here is based on the requirement that sensitive data, especially keys, can be stored in the card, and all operations where these key are involved can be performed in the card. Different classes of the cards are introduced to define how widely the functionality is implemented.

This specification is based on ISO7816 series of standards on smart cards. In particular, it uses the ISO7816-8 standard (draft) [ISO7816-8]. When this functionality is applied to GSM SIM there may be a need to extend also the related GSM specifications [GSM11.11], where applicable.

According to the invention the smart card 16 is used to enhance security of the implementation of the Security Layer and certain functions of the Application Layer. The smart card 16 can be used for several purposes for WTLS. The major purposes of the smart card 16 is to perform cryptographic operations during the handshake, especially when the handshake is used for client authentication. Furthermore, the memory of the smart card 16 is used for securing a master secret, a public key and other type of confidential material during long-living WTLS sessions. Finally the memory of the smart card 16 is used for recording the level of security of the sessions. According to the invention the WTLS support in a smart card 16 can be described with reference to the following three embodiments.

First Embodiment

According to this embodiment, the smart card 16 is used for storage of permanent, typically certified, private keys for performing operations using these keys. The operations include signing operations (for example, ECDSA or RSA) for client authentication when needed for the selected handshake scheme; key exchange operations using a fixed client key (for example, ECDH key, in ECDH_ECDSA handshake).

The smart card 16 is not required to perform the calculation of the master secret or operations using the master key. These calculations may advantageously be performed by the processor or controller 18 of the phone. However, the smart card 16 may act as a persistent storage for WTLS secure session (and connection) data, including master secrets. In this case, master secrets would be calculated and used for key derivation in the volatile phone memory (the RAM 17a) but erased from there when not needed at that moment, for example, when the user exits from secure WAP applications. Not storing session data persistently in phone 1 may improve security, for example, in the case of a stolen phone 1. It also brings better usability in the case of changing the smart card 16 from one phone 1 to another.

Additionally, for portability, the smart card 16 may store needed certificates. Storage of trusted root certificates (or public keys) has significance also from security point of view: they must not be altered—but they can be exposed without danger.

Note that when the public key encryption based key exchange (for example, RSA) is used according to the first embodiment of the invention, there is no advantage in doing public key encryption on the smart card 16 when the pre-master secret would be returned to the phone 1, for master secret calculation in the controller 18.

When client authentication is not supported in WTLS, at the minimum, the smart card 16 only acts as a storage for session data. If client authentication is supported, the card would be able to perform a signing operation based on a private key (for example, ECDSA or RSA) stored in the card, or key agreement calculation (for example, ECDH) based on a fixed key stored in the card.

Second Embodiment

According to the second embodiment, the smart card 16 is used as a tamper resistant device for all crypto-critical functionality: storage of all persistent keys and operations using these keys. Besides the operations performed according the first embodiment, the smart card 16 now also support the calculation (ECDH key exchange) or generation (RSA key exchange) of the pre-master secret; calculation and storage of the master secret for each secure session; and derivation and output of key material (for MAC, encryption keys, IV, finished check), based on the master secret.

The phone 1 stores MAC and message encryption keys as long as they are currently needed. These keys have a limited lifetime which may be negotiated during the WTLS handshake—in the extreme case they are used for a single message only. The phone 1 has to delete the keys from its RAM memory 17a when the user exits from the secure WAP applications. These keys can always be derived anew from the master secret if needed.

An attacker who obtains a message encryption key can read as many messages as is agreed in the key refresh configuration (in the extreme case, a single message). An attacker who obtains a MAC key can impersonate the compromised party during as many messages as is agreed in the configuration (in the extreme case, a single message).

Third Embodiment

Certain specialized smart cards 16 may act as full-blown security engines for WTLS. This requires that the smart card 16 is equipped with its own processing unit and only uses the phone 1 as an interface to the cellular network during the secure session set up or the handshake procedure. Besides the operations according to the second embodiment, the smart card 16 may store the MAC and encryption keys for each secure connection; and perform MAC calculation/verification and encryption/decryption of messages.

Furthermore, the smart card 16 may be responsible for the verification of certificates and the verification of digital signatures.

Note that having message encryption in the smart card 16 does not necessarily bring any additional security because in any case the data is as plain text in the phone 1. The same is true for MAC calculation: the phone 1 must be trusted to input and output data in a correct way. The only advantage here would be not having to take encryption keys out of the card 16. However, the keys have a limited lifetime which is negotiated during the WTLS handshake—in the extreme case they are used for single message only. According to the third embodiment, the smart card 16 will contain all algorithms so that they could be controlled by smart card issuers.

Smartcard

The term "smartcard" covers a card-like unit having some memory means in which some secret information identifying the card holder is stored. The memory means may be a magnet strip that may be read by a magnet reader, or it may be provided as discrete memory components as a ROM, EEPROM, etc. When the user inserts the smart card in a more or less public apparatus the user may become authorized to perform some operations such as banking operations. Presently the user of a GSM phone is identified by a so-called Subscriber Identity Module or a SIM card 16, and the structure of this type of smart card is defined in the GSM specification "Specification of the Subscriber Identity Module—Mobile Equipment (SIM—ME) interface", GSM 11.11 version 5.5.0, published by European Telecommunications Standards Institute; ETSI. The present type of smartcards will be able to support the first embodiment explained above.

Gemplus has recently launched a smartcard, GemEpresso RAD, based on a 32-bit chip from Texas Instruments using ARM7 RISC care technology. This 32 bit RISC processor has 32 kbyte of non volatile flash memory and 8 kbyte of ROM. When the mechanical interface of the Gemplus card is adapted to fulfill the GSM specification this type of smartcard will be able to support the second and the third embodiments.

Network

Figure 3:
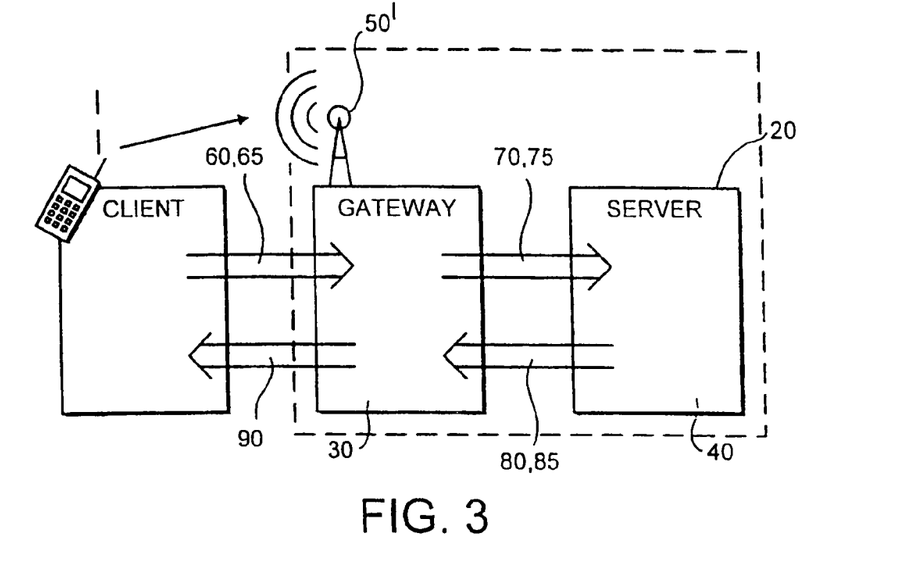
FIG. 3 schematically shows how the secure session is set up between a client/phone and a server according to the invention.

FIG. 3 schematically shows how the secure session, that is a secure connection, between a data communication apparatus and a wireless communication apparatus, for example a cellular phone 1. Basically the WAP content and applications are specified in a set of well-known content formats based on the familiar WWW content formats. Content is transported using a set of standard communication protocols based on the WWW communication protocols. A browser in the phone 1 co-ordinates the user interface and is analogous to a standard web browser.

The wireless communication apparatus 1 is a client 1 who wants to establish a secure connection to a server 20,30,40, which is the data communication apparatus 20,30,40. The client is provided in an environment, which make it possible to reach a wide variety of different wireless platforms, for example world wide web (WWW). The environment provided may be referred to as Wireless Application Environment (WAE). This means that the client 1 may be supported by some kind of browser, for example a micro-browser, to access the different services connected to the server. In order to access these services the browser may comprise the following functionalities:

Wireless Markup Language (WML)—a lightweight markup language, similar to HTML, but optimized for use in hand-held mobile terminals;

WMLScript—a lightweight scripting language, similar to JavaScript™;

Wireless Telephony Application (WTA, WTAI)—telephony services and programming interfaces; and Content Formats—a set of well-defined data formats, including images, phone book records and calendar information.

The server 20 is using a wireless application protocol, and may comprise a gateway 30 and an origin server 40. The gateway 30 is also a server, which may identify and encrypt/decrypt information between the client 1 and the origin server 40. This means that the gateway is provided with encoders and decoders (not shown). Also, the server 20 comprises different algorithms to make the encryption/decryption. The encryption/decryption itself may be performed by well-known methods, for example RSA, Diffie-Hellman, etc. The origin server 40 comprises different scripts to support WAP and data to be accessed by the client. This data may be all kind of information, for example weather reports, news, information from stock markets, etc.

In order to access the server 20, from the client 1, the server has to be connected to a wireless communication network 50, for example a cellular phone network. Therefore, in accordance with the present invention, the client is provided with contact means (not shown) for receiving information from a separate unit (not shown) provided with memory means. This separate unit may be a smart card, subscriber identity module (SIM), or the like. The memory means may be a random access memory (RAM), read only memory (ROM), or the like. Further, the memory means comprises information to control the access of the server 20 through the wireless communication network 50.

To establish a secure connection, the client 1 connects to the separate unit, accessing the wireless communication network 50 connected to the server 20. Then the client 1 transmits an encrypted request 60 through the gateway 30. The encrypted request 60 comprises information of which pre-defined algorithm(s) the client 1 supports. When the gateway 30 receives this decrypted request 60, it sends 70 the encrypted request to the origin server 40. The origin server 40 chooses at least one algorithm, associated with a public key and a private key, and transmits a message 80 back to the gateway 30. The gateway encrypts the message and sends it 90 to the client 1. This message 90 comprises the public key information about which algorithm the server 20 has chosen. When the client 1 receives the encrypted message 90, comprising the public key, it will generate a master secret code, and calculates a signature based on the chosen algorithm, the public key and the master secret code. Thereafter, the client 1 will transmit an encrypted response 65 to the gateway 30. This encrypted response 65 comprises the calculated signature. When the gateway 30 receives the encrypted response 65, comprising the signature, it will decrypt the response 75 and send it to the origin server 40. The origin server 40 will calculate the master secret code based on the chosen algorithm, the signature received, and its private key. Finally, the origin server 40 sends a final message 85 to the client through the gateway 30. If the origin server 40 has accepted the client request 60, the server will be able to establish a secure connection between the origin server 40 and the client 1, else the connection will be terminated.

Setting up a Secure Connection.

Figure 4:
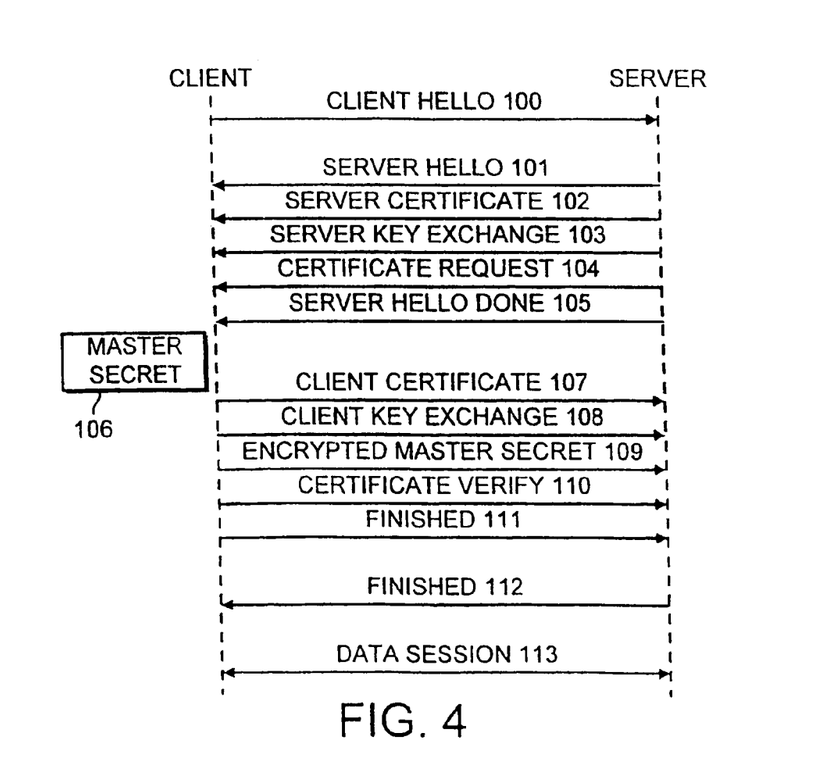
FIG. 4 illustrates the message structure for setting up a secure connection according to the invention.

FIG. 4 illustrates the message structure for setting up a secure connection according to the invention.

The cryptographic parameters of the secure session are produced by the WTLS Handshake Protocol, which operates on top of the WTLS Record Layer. When a WTLS client and server first start communicating, they agree on a protocol version, select cryptographic algorithms, optionally authenticate each other, and use public-key encryption techniques to generate a shared secret.

The WTLS Handshake Protocol is described Wireless Transport Layer Security Specification dated 30 Apr. 1998 and is part of the Wireless Application Protocol.

The WTLS Handshake Protocol involves the following sequence of steps. When the a WAP session has been set between the phone 1 (the client) and the server 20 (for example a bank), and the client (phone 1) wants to establish a secure connection the client sends a client hello message 100 as the first message. This message includes a key exchange list that contains the cryptographic key exchange algorithms supported by the client in decreasing order of preference. In addition, each entry defines the certificate or public key the client wishes to use. The server will select one or, if no acceptable choices are presented, return a handshake_failure alert and close the secure connection.

In response to the client hello message 100, the server 20 will send a server hello message 101 when it was able to find an acceptable set of algorithms. If it cannot find such a match, it must respond with a handshake_failure alert. The server hello message 101 will identify the session and set up the parameters need for the session.

The server 20 will furthermore transmit a server certificate message 102. The server certificate message 102 will always immediately follow the server hello message 101, and the purpose of this server certificate message 102 is to identify the encryption algorithm selected by the server from the key exchange list included in the client hello message 100. The server certificate message 102 will include a so-called certificate carrying a public key for the selected encryption algorithm. The server certificate message 102 includes information about the issuer of the certificate, the beginning and the end of the validity period, and parameters relevant or the public key. The server controls the validity period and, when the granted validity period is expired, the client has to renew the secure connection. The length of the validity period will typically be in the level of a week or more. The maximum number of session will also have to be identified.

A Server Key Exchange Message 103 will be send as a third message immediately after the server certificate message 102. The server key exchange message 103 is optional and will be sent by the server 20 only when the server certificate message 102 does not contain enough data to allow the client 1 to exchange a pre-master secret. This message 103 conveys cryptographic information to allow the client to communicate the pre-master secret: either an RSA public key to encrypt a secret with, or Elliptic Curve Diffie-Hellman parameters with which the client can complete a key exchange (with the result being the pre-master secret). As additional Key Exchange Suites are defined for WTLS which include new key exchange algorithms, the server key exchange message will be sent if and only if the certificate type associated with the key exchange algorithm does not provide enough information for the client to exchange a pre-master secret.

Also a fourth message—a Server Certificate message 104—is optional. This message 104 requests a certificate from the client, if appropriate for the selected cipher suite. This message will immediately follow the Server Certificate message 102 and Server Key Exchange message 103.

In order to inform the client that the server has ended of the Server Hello session, it transmits a Server Hello Done message 105. After sending this message 105 the server 20 will wait for a client response. This message indicates that the server 20 has sent messages to support the key exchange, and that the client 20 can proceed with its phase of the key exchange. Upon receipt of the server hello done messages the client should verify that the server provided a valid certificate if required and check that the server hello parameters are acceptable.

If the server 20 asks for an Client Certificate message 107, the client 1 has to transmit such a after receiving a Server Hello Done message 105. This message is only sent if the server 20 requests a certificate. If no suitable certificate is available, the client must send a certificate message containing no certificates. If client authentication is required by the server for the handshake to continue, it may respond with a fatal handshake_failure alert. Client certificates are sent using the Certificate structure defined previously for server certificates.

Now the phone 1 or the client starts to calculate a 20 byte random number to be used as a Master Secret 106 for the secure sessions. The master secret 106 is used to derive key material needed for Message Authentication Code (MAC) keys and data encryption keys. MAC and data encryption provide data integrity and privacy between communicating parties. A public key based key establishment is a heavy procedure both computationally and due to intensive data transfer. That is why, there is a need to use the mutually agreed master secret 106 for a relatively long time.

The processor or controller 18 of the phone 1 calculates the master secret. A smart card, e.g. the SIM card 16, which can be regarded as a tamper resistant device, is used for storage of the sensitive data of the secure session, and performing operations using that sensitive data, so that this data never leaves the card. In practice the secure information will be transferred from the SIM card 16 to the working RAM 17a of the processor 18 but these information will be overwritten when no session is ongoing or when the phone 1 is switched off.

According to the first embodiment of the invention, the controller or processor 18 performs the operations needed for the key establishment, for example, Diffie-Hellman calculation or RSA encryption and complementary calculations. Then the controller 18 persistently stores the resulting secret key (master secret 106) in the SIM card 16. Then the controller 18 performs the key derivation based on the master secret 106 and additional data (for example, seed), producing key material for MAC calculation and encryption. The key derivation function is security protocol specific. It is typically based on some secure hash function, for example, SHA-1.

Preferably the SIM card 16 is provided as a smart card having its own processor, whereby both the operations needed for performing the key establishment and the key derivation based on the master secret may be performed inside the smart card. Then the master secret, and data used to calculate it, would never have to leave smart card. So, the secure session associated with the master secret can be used during a long period.

A Client Key Exchange Message 108 will immediately follow the client certificate message 107, if it is sent. Otherwise it will be the first message sent by the client 1 after it receives the Server Hello Done message 105. With this message 108, a pre-master secret is set, either through direct transmission of the RSA-encrypted secret, or by the transmission of EC Diffie-Hellman public key which will allow each side to agree upon the same pre-master secret.

Then the Master Secret 106 is encrypted by using the public key from the server's certificate and the agreed RSA algorithm. The result is sent to the server 20 in an encrypted master secret message 109.

A Certificate Verify message 110 is used to provide explicit verification of a client certificate. This message is only sent by the client following a client certificate Message 107 that has signing capability (that is, RSA certificates).

Both ends have to send finished messages 111 and 112 at the end of the handshake to verify that the key exchange and authentication processes were successful.

The finished messages 111 and 112 are the first messages protected with the just-negotiated algorithms, keys, and secrets. Recipients of finished messages must verify that the contents are correct. Once a side has sent its finished message and received and validated the finished message from its peer, it may begin to send and receive application data 113 over the secure connection. It is a critical or fatal error if a finished message is not preceded by a change cipher spec message at the appropriate point in the handshake.

The value handshake_messages includes all handshake messages starting at client hello up to, but not including, this finished message. The handshake_messages for the finished message sent by the client will be different from that for the finished message sent by the server, because the one which is sent second will include the prior one.

As long as a secure connection is valid application data session 113 may be initiated just by using Client Hello messages 100 and Server Hello messages 101.

ACRONYMS

| | |
|---|---|
| APDU | Application Protocol Data Unit |
| API | Application |
| CA | Certification Authority |
| CBC | Cipher Block Chaining |
| DF | Dedicated File |
| DH | Diffie-Hellman |
| EC | Elliptic Curve |
| ECC | Elliptic Curve Cryptography |
| ECDH | Elliptic Curve Diffie-Hellman |
| ECDSA | Elliptic Curve Digital Signature Algorithm |
| EF | Elementary File |
| GSM | Global System for Mobile Communication |
| IV | Initialization Vector |
| MAC | Message Authentication Code |
| ME | Management Entity |
| OSI | Open System Interconnection |
| PDU | Protocol Data Unit |
| PRE | Pseudo-Random Function |
| SAP | Service Access Point |
| SDU | Service Data Unit |
| SHA-1 | Secure Hash Algorithm |
| SIM | Subscriber Identity Module |
| SMS | Short Message Service |
| SSL | Secure Sockets Layer |
| TLS | Transport Layer Security |
| WAP | Wireless Application Protocol |
| WML | Wireless Markup Language |
| WMLScript | Wireless Markup Language Script |
| WDP | Wireless Datagram Protocol |
| WSP | Wireless Session Protocol |
| WTLS | Wireless Transport Layer Security |
| WTP | Wireless Transaction Protocol |

The list above includes the acronyms used in the present text. Detailed discussion and explanation of the acronyms may be found in the technical specification defining the Wireless Application Protocol on the Internet homepage for WAPFORUM.

The invention claimed is:
1. A method for establishing a secure connection between a wireless communication apparatus and a data communication apparatus based on a wireless application protocol, wherein the wireless communication apparatus has memory means included within a separate unit comprising information to control the access of the wireless communication apparatus through a wireless communication network connected to the data communication apparatus, comprising:
  connecting the wireless communication apparatus to the separate unit, accessing the wireless communication network connected to the data communication apparatus;
  the wireless communication apparatus transmits a request to the data communication apparatus to establish a connection, the request comprising information of which at least one pre-defined algorithm the wireless communication apparatus supports;
  upon reception of the request, the data communication apparatus chooses at least one algorithm associated with a public and a private key, and transmits a message back to the wireless communication apparatus, the message comprising the public key and information about which algorithm the data communication apparatus has chosen;

in response to the message comprising the public key, the wireless communication apparatus generates a master secret code and calculates a signature based on the chosen algorithm, the public key and the master secret code, and transmits a response to the data communication apparatus, the response comprising the calculated signature;

upon reception of the response comprising the signature, the data communication apparatus calculates the master secret code based on the chosen algorithm, the signature received and the private key, and establishes a secure connection to the wireless communication apparatus, and saves the master secret code on the memory in order to re-establish the connection between the wireless communication apparatus and the separate unit at a later occasion.

2. A method according to claim 1, comprising saving the master secret code under a pre-defined time.

3. A method according to claim 2, further comprising re-establishing the connection by transmitting a second request from the wireless communication apparatus to the data communication apparatus, the second request comprising the calculated signature based on the chosen algorithm, the public key and the stored secret code, and upon reception of the request, the data communication apparatus calculates the master secret code based on the chosen algorithm, the signature received, and the private key, and, establishes a secure connection to the wireless communication apparatus.

4. A method according to claim 2, comprising providing the memory means as a smart card.

5. A method according to claim 1, further comprising re-establishing the connection by transmitting a second request from the wireless communication apparatus to the data communication apparatus, the second request comprising the calculated signature based on the chosen algorithm, the public key and the stored master secret code, and upon reception of the second request, the data communication apparatus calculates the master secret code based on the chosen algorithm, the signature received, and the private key, and, establishes a secure connection to the wireless communication apparatus.

6. A method according to claim 5, comprising providing the memory means as a smart card.

7. A method according to claim 1, comprising providing the memory means as a smart card.

8. A wireless communication apparatus for establishing a secure connection to a data communication apparatus based on a wireless application protocol, the wireless communication apparatus comprising:

communication means for establishing a connection to a wireless communication network connected to the data communication apparatus, memory means included within a separate unit provided with information to control the access of the data communication apparatus through the wireless communication network;

means for generating a master secret code in response to a message from the data communication apparatus;

control means arranged to use at least one pre-defined algorithm for generating a signature based on the master secret code and a public key received from the data communication apparatus, for use when the wireless communication apparatus establishes a secure connection to the data communication apparatus; and the memory means comprises a secure database for storing the master secret code and the signature related to the data communication apparatus, in order to re-establish a secure connection to the data communication apparatus.

9. A wireless communication apparatus according to claim 8, wherein the memory means is exchangeable.

10. A wireless communication apparatus according to claim 9 wherein the master secret code is stored on the separate unit.

11. A wireless communication apparatus according to claim 9 wherein the master secret code is generated on the separate unit.

12. A wireless communication apparatus according to claim 9 wherein the signature is generated on the separate unit.

13. A wireless communication apparatus according to claim 9 wherein the separate unit comprises a smart card.

14. A wireless communication apparatus according to claim 8 wherein the master secret code is stored on the separate unit.

15. A wireless communication apparatus according to claim 14 wherein the master secret code is generated on the separate unit.

16. A wireless communication apparatus according to claim 14 wherein the signature is generated on the separate unit.

17. A wireless communication apparatus according to claim 14 wherein the separate unit comprises a smart card.

18. A wireless communication apparatus according to claim 8 wherein the signature is stored on the separate unit.

19. A wireless communication apparatus according to claim 18 wherein the master secret code is generated on the separate unit.

20. A wireless communication apparatus according to claim 18 wherein the signature is generated on a separate unit.

21. A wireless communication apparatus according to claim 18 wherein the separate unit comprises a smart card.

22. A wireless communication apparatus according to claim 8 wherein the master secret code is generated on the separate unit.

23. A wireless communication apparatus according to claim 22 wherein the signature is generated on the separate unit.

24. A wireless communication apparatus according to claim 22 wherein the separate unit comprises a smart card.

25. A wireless communication apparatus according to claim 8 wherein the signature is generated on the separate unit.

26. A wireless communication apparatus according to claim 25 wherein the separate unit comprises a smart card.

27. A wireless communication apparatus according to claim 8 wherein the separate unit comprises a smart card.

28. An apparatus according to claim 27 wherein the smart card is a subscriber identity module.

29. A memory card for establishing a secure connection between a wireless communication apparatus and a data communication apparatus based on a wireless application protocol, the memory card comprising being arranged to be connected to contact means, provided on the wireless communication apparatus, for providing information from the memory card to the wireless communication apparatus upon establishing a secure session to a data communication apparatus, the information is arranged to control the access of the data communication apparatus through a wireless communication network, and to save a calculated master secret code previously generated in response to a message previously received from a data communication apparatus, in order to re-establish a secure connection to the data communication apparatus.

30. A memory card according to claim 29, further comprising encryption means for encrypting the master secret, which is to be used as a signature for the wireless communication apparatus when the wireless communication apparatus is establishing a secure connection.

31. A memory card according to claim 30, comprising a secure database provided with at least one of a master secret code and at least one signature related to at least one data communication apparatus, in order to reestablish a secure connection to data communication apparatus.

32. A memory card according to claim 30, provided on a smart card.

33. A memory card according to claim 29, comprising a secure database provided with at least one of a master secret code and at least one signature related to at least one data communication apparatus, in order to reestablish a secure connection to data communication apparatus.

34. A memory card according to claim 33, provided on a smart card.

35. A memory card according to claim 29, provided on a smart card.

36. A system for establishing a secure connection when using a wireless application protocol, comprising:
   a data communication apparatus based on the wireless application protocol;
   a wireless communication network, connected to the data communication apparatus;
   a wireless communication apparatus having memory means included within a separate unit comprising information to control the access of the wireless communication apparatus through the wireless communication network; wherein
   the wireless communication apparatus is arranged to transmit a request to the data communication apparatus to establish a connection, the request comprising information of which at least one pre-defined algorithm the wireless communication apparatus supports;
   upon reception of the request, the data communication apparatus is arranged to choose at least one algorithm, associated with a public key and a private key, and to transmit a message back to the wireless communication apparatus, the message comprising the public key and information about which algorithm the data communication apparatus will choose;
   in response to the message, comprising the public key, the wireless communication apparatus is arranged to generate a master secret code, to calculate a signature based on the chosen algorithm, the public key and the master secret code, and to transmit a response to the data communication apparatus, the response comprising the calculated signature;
   upon reception of the response comprising the signature, the data communication apparatus is arranged to calculate the master secret code based on the chosen algorithm, the signature received, and the private key, to establish a secure connection to the wireless communication apparatus; and
   the memory means is arranged to save the master secret code, in order to re-establish the connection at a later occasion.

37. A system according to claim 36, wherein the master secret is arranged to be saved under a pre-defined time.

38. A system according to claim 37, wherein the memory means is a smart card.

39. A system according to claim 36, the memory means is a smart card.

40. A wireless communication apparatus for establishing a secure connection to a data communication apparatus through a wireless network based on a wireless application protocol, the wireless communication apparatus comprising:
   means for establishing a connection with the data communication apparatus through the wireless network;
   means for retrieving access information including which of a set of at least one pre-defined algorithm is supported, for transmission to the data communication apparatus;
   means for processing information including a public key and selection of one of the at least one supported algorithm received from the data communication apparatus for storage;
   means for retrieving a signature based on a generated master secret code and the public key received from the data communication apparatus the generated master secret code being generated in response to a message received from the data communication apparatus; and
   means for utilizing the signature and the master secret code during communication with the data communication apparatus in order to re-establish a secure connection.

41. A memory card for establishing a secure connection between a wireless communication apparatus and a data communication apparatus based on a wireless application protocol and comprising contact means for cooperation with the wireless communication apparatus, the memory card comprising:
   a memory that stores a master secret code associated with the data communication apparatus and having been generated in response to a request from the wireless communication apparatus to provide such code for utilization of the master secret code during communication with the data communication apparatus in order to re-establish a secure connection.

42. A wireless communication apparatus for establishing a secure connection to a data communication apparatus based on a wireless application protocol, the wireless communication apparatus comprising:
   communication means for establishing a connection to a wireless communication network connected to the data communication apparatus;
   memory means provided with information to control the access of the data communication apparatus through the wireless communication network upon establishing a secure session to a data communication apparatus;
   reading means for reading information received from the data communication apparatus and the information provided on the memory means;
   means for generating a master secret code;
   control means arranged to use at least one pre-defined algorithm for generating a signature based on the master secret code and a public key received from the data
   communication apparatus, which is to be used when the wireless communication apparatus is going to establish a secure connection to the data communication apparatus; and
   the reading means comprising a secure database provided with at least one of a master secret code and at least one signature related to at least one data communication apparatus, in order to re-establish a secure connection to a data communication apparatus.

43. A wireless communication device for receiving therein a separate unit with memory means, the device being operable to establish a secure connection with a data communication apparatus based on a wireless application protocol through a wireless communication network, the wireless communication device comprising: communication means for establishing the connection with the data communication apparatus, electrical contact means for communicating information between the communication means and the separate unit, the device being configured so that when the separate unit is received therein the resulting combination is operable to:

generate a master secret code in response to a message received from the data communication apparatus;

use a pre-defined algorithm to create a signature for use when the wireless communication device establishes a secure connection to the data communication apparatus, the signature being based on the master secret code and a public key received from the data communication apparatus; and to store the master secret code and the signature related to at least one data communication apparatus in the memory means of the separate unit to enable re-establishment of the secure connection on a later occasion.

44. A wireless communication device according to claim 43 operable when the separate unit is received therein to retrieve the at least one of at least one master secret code and at least one signature when re-establishing the secure connection on a later occasion.

45. A wireless communication device according to claim 44 operable when the separate unit is received therein to cause both the generation and storage of the master secret code in the separate unit.

46. A wireless communication device according to claim 45 wherein the contact means are configured to receive the separate unit in the form of a smart card.

47. A wireless communication device according to claim 45 wherein the contact means are configured to receive the separate unit in the form of a SIM card.

48. A wireless communication device according to claim 44 including a processor operable to generate the master secret code.

49. A wireless communication device according to claim 48 wherein the contact means are configured to receive the separate unit in the form of a smart card.

50. A wireless communication device according to claim 44 operable when the separate unit is received therein to cause the generation of the signature in the separate unit.

51. A wireless communication device according to claim 50 wherein the contact means are configured to receive the separate unit in the form of a smart card.

52. A wireless communication device according to claim 44 wherein the contact means are configured to receive the separate unit in the form of a smart card.

53. A wireless communication device according to claim 44 wherein the contact means are configured to receive the separate unit in the form of a SIM card.

54. A wireless communication device according to claim 43 operable when the separate unit is received therein to cause both the generation and storage of the master secret code in the separate unit.

55. A wireless communication device according to claim 54 operable when the separate unit is received therein to cause the generation of the signature in the separate unit.

56. A wireless communication device according to claim 55 wherein the contact means are configured to receive the separate unit in the form of a smart card.

57. A wireless communication device according to claim 54 wherein the contact means are configured to receive the separate unit in the form of a smart card.

58. A wireless communication device according to claim 54 wherein the contact means are configured to receive the separate unit in the form of a SIM card.

59. A wireless communication device according to claim 43 including a processor operable to generate the master secret code.

60. A wireless communication device according to claim 45 operable when the separate unit is received therein to cause the generation of the signature in the separate unit.

61. A wireless communication device according to claim 60 wherein the contact means are configured to receive the separate unit in the form of a smart card.

62. A wireless communication device according to claim 59 wherein the contact means are configured to receive the separate unit in the form of a smart card.

63. A wireless communication device according to claim 43 operable when the separate unit is received therein to cause the generation of the signature in the separate unit.

64. A wireless communication device according to claim 63 wherein the contact means are configured to receive the separate unit in the form of a smart card.

65. A wireless communication device according to claim 43 wherein the contact means are configured to receive the separate unit in the form of a SIM card.

* * * * *